Dec. 9, 1969   F. J. G. VAN DEN BOSCH   3,482,898
MICROSCOPE SYSTEM AND RESERVOIR FOR CHEMICAL PREPARATIONS
Filed Feb. 6, 1967
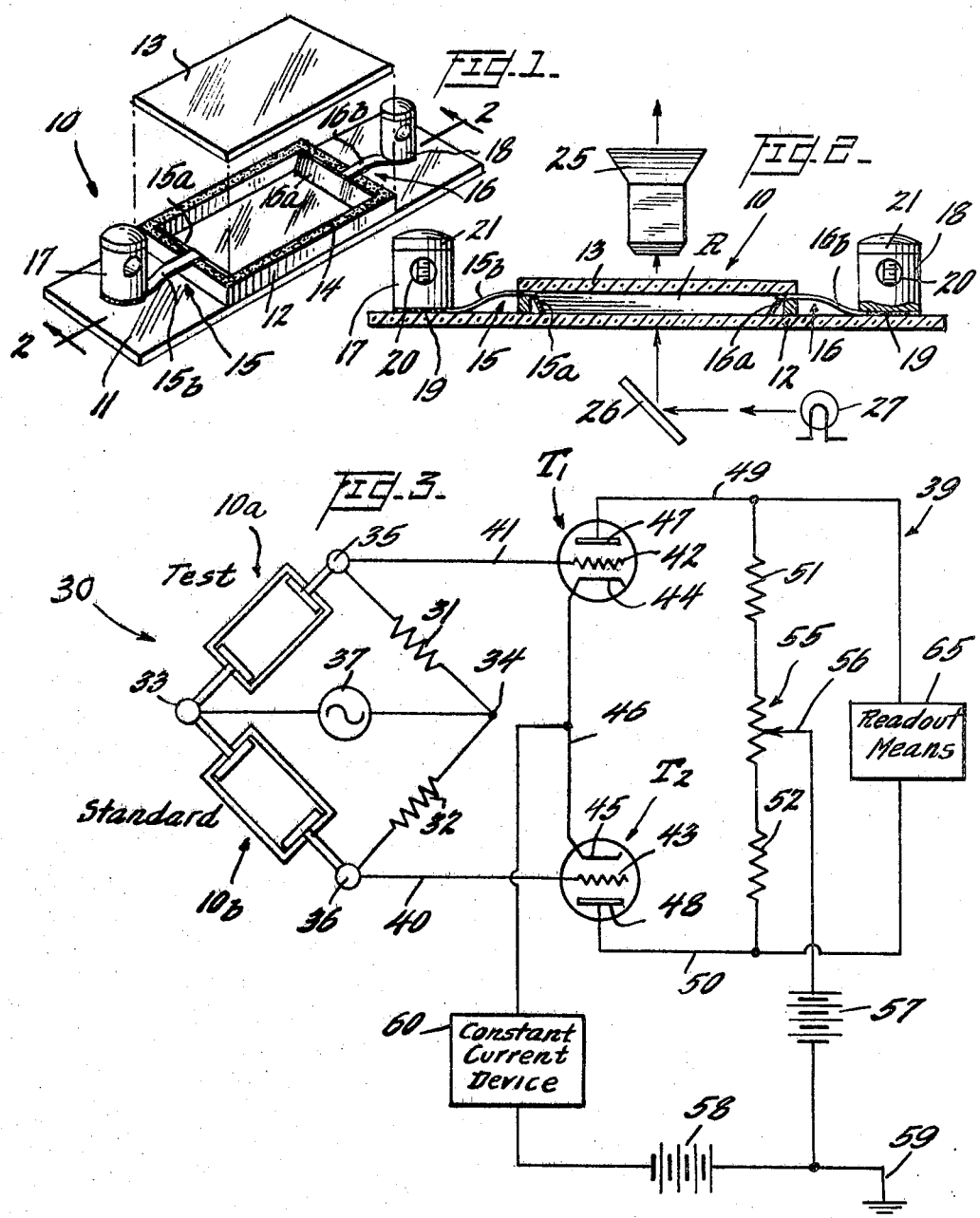
INVENTOR.
F. J. G. van den Bosch,
BY
Watson, Cole, Grindle & Watson
ATTORNEYS

United States Patent Office 3,482,898
Patented Dec. 9, 1969

3,482,898
MICROSCOPE SYSTEM AND RESERVOIR FOR CHEMICAL PREPARATIONS
Francois J. G. van den Bosch, 11 Hillcrest Road,
Cedar Grove, N.J. 07009
Filed Feb. 6, 1967, Ser. No. 614,200
Int. Cl. G02b 21/34
U.S. Cl. 350—95                                   5 Claims

ABSTRACT OF THE DISCLOSURE

An apparatus for facilitating optically viewing and electrically monitoring a preparation including a microscope stage having a reservoir with high efficiency electrodes and interconnected fixed terminals. A simplified electrical circuit including a Wheatstone bridge is provided for the monitoring function of the spacimen through the electrodes with an additional specimen stage holding a standard solution utilized as a reference.

---

The present invention relates to an improved microscope system and, more particularly, to an apparatus for allowing simultaneous optical and electrical observations and measurements of a chemical preparation.

Heretofore, it has been proposed in studying the characteristics of a chemical preparation to place a specimen on a conventional microscope slide with the tips of wire electrodes extending into the specimen for observing the affect of electric current thereon, as shown for example by the U.S. patent to Porter 2,498,220, issued Feb. 21, 1950. While the prior art arrangements, as exemplified by Porter, have proven to be acceptable for observing the basic electrolytic action of specimens, much is left to be desired when monitoring the specimen for resistive characteristics by an electrical circuit. For example, such prior art wire electrodes are adapted to engage the specimen only in a limited point area which greatly impedes the current transferring properties between the electrode and the liquid specimen. Because of this low efficiency, it is usually proposed in the known monitoring circuits that a series of high gain amplifiers be used in order to obtain a satisfactory output signal. Also, these prior art slides have no fixed terminal connections for inserting the same into an electrical circuit so that imperfect connections sometimes result which further lowers the efficiency of the test set up.

Accordingly, it is one object of the present invention to provide an improved microscope stage having high efficiency electrodes and terminals fixed to the base of the stage for interconnection of the monitoring circuit.

It is a related object of the present invention to provide an overall microscope system including the improved microscope stage of the invention and a simplified electrical circuit for monitoring the resistive characteristics of the preparation being identified.

In brief, the apparatus of the present invention includes a microscope stage having an elongated transparent base and an upstanding closed wall member on said base forming a reservoir for the preparation. Opposed high efficiency electrodes which extend across the full width of the reservoir are utilized for introducing electrical energy into the preparation for observation and monitoring purposes. A pair of electrical terminals is fixed to the base for connecting the respective electrodes to the related monitoring circuit which allows the stage of the invention to be quickly and securely inserted into said circuit.

Preferably, the electrodes are formed of thin, high conductivity metal, such as platinum, and are T-shaped; the elongated cross element extending across the width of the reservoir and to a depth equal to the height of the reservoir for maximum current flow through the preparation. The leg of the T of the electrode extends over the wall member for connection to the terminals and provision is made for rendering the reservoir airtight with a transparent cover plate in sealed engagement with the wall member.

In accordance with the other aspect of the present invention, the high efficiency electrodes of the microscope stage are interconnected with a simplified electrical circuit for determining the resistive characteristics of the preparation from which such parameters as PH factor, conductivity, dielectric constant, polarimetry, strength, concentration, or any other chemical property may be monitored. The circuit utilizes a Wheatstone bridge with the outputs of the bridge being connected to a special reading circuit through the control grids of a pair of electrical amplifying means. A rheostat is connected in series with the pair of amplifying means for simultaneously varying the current therethrough and which is utilized for balancing the bridge prior to the monitoring operation. A readout means is provided in parallel with the rheostat in the reading circuit to detect output signal imbalance to thus measure the variance in resistance across the electrodes of the microscope stage from the standard reference and to thereby identify the resistive characteristics of the preparation.

Preferably, the standard reference comprises a second microscope stage also constructed in accordance with the principles of the present invention and filled with a preparation of known resistive characteristics whereby a direct comparison may be made in the system. Advantageously, the reading circuit is rendered immune to voltage variations due to the fact that the output signal is in all cases a differential signal and it is contemplated that said output signal can be measured with any desired conventional indicating device, such as for example, a center scale voltmeter, a pen recorder or a cathode ray tube type oscilloscope. Further, it is contemplated that a constant current device may be interposed in the reading circuit to further enhance the accuracy of the readout operation.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIGURE 1 is a perspective view of the microscope stage constructed in accordance with the present invention and with the cover plate removed for clarity;

FIGURE 2 is a cross-sectional view taken along line 2—2 of FIGURE 1 and showing the relationship with the parts of a microscope; and FIGURE 3 is a schematic diagram of a monitoring circuit particularly adapted for use with the microscope stage of FIGURES 1 and 2.

Referring now to the drawings and for a more specific description of the apparatus of the present invention, and in particular with reference to FIGURE 1, there is illustrated a microscope stage 10, which constitutes a preferred embodiment of the invention. The stage 10 comprises an elongated base 11 upon which is suitably fixed an upstanding closed wall member 12 for forming a reservoir to receive the chemical preparation, as will be seen later in detail. The wall member 12 is preferably rectangularly shaped to conform to the general outline of the center portion of the base 11 and is shown in somewhat exaggerated proportion in height for clarity; it being understood that, in reality, reservoir R is only approximately .5 mm. deep so that the amount of preparation included for testing is, in fact, not large. A cover plate 13 is provided for closing the reservoir R and said reservoir R can be rendered airtight by providing a suitable sealing material 14 around the upper edge of the wall member 12 so that it is possible to study materials that are adversely affected by temperature or pressure changes or other atmospheric conditions. This sealing material 14 can be any of the conventionally known sealing products of a grease or paraffin base.

As well illustrated in FIGURES 1 and 2 of the drawings, the stage 10 of the invention is provided with T-shaped electrodes positioned at opposite ends of the reservoir and generally designated by the reference numerals 15, 16. These electrodes 15, 16, which form an important feature of the present invention, are preferably fabricated from thin, strip-like platinum metal or of any other metal of high electrical conductivity, and each comprises a cross member 15a, 16a and a leg 15b, 16b, respectively. As shown in these figures, the cross members 15a, 16a extend across the full width of the reservoir, and the projected height of the cross members 15a, 16a is equal to the height of the reservoir R so that the full cross section of the preparation, which may be any solution, emulsion, liquid with suspended solid or the like chemical specimen, is exposed to the surface of the electrodes 15, 16. This results in the electrodes 15, 16 being of high efficiency in terms of transmission of electric current to and from the preparation during operation so that the resistive characteristics of the same may be more accurately obtained, as will be discussed more fully below.

As shown in these figures, the leg 15b may depend over the wall member and into the reservoir so that there is no need to form apertures in the wall member 12 and thus encounter necessary sealing problems attendant therewith. Because the electrodes are of thin metal, the cover plate 13 is capable of being received in airtight engagement on the wall member 12 with the sealing material 14 forming a satisfactory seal in the areas around the legs 15b, 16b.

The free end of the legs 15b, 16b of electrodes 15, 16 are conductively connected to post-like terminals 17, 18 due to the placement thereunder and the fixing of the same to the base 11 by a suitable cement, indicated at 19.

An aperture 20 is formed in each of the terminals 17, 18 wherein the connecting wire from an electrical circuit may be inserted. Threadedly engaging the terminals 17, 18 are cap screws 21 which are adapted to securely clamp the wire into engagement, and of course which are capable of quick attachment of the microscope stage 10 into a circuit, as desired.

The base 11 and the cover plate 13 are formed of optically inactive glass, such as fused silica or fluorite, so that the stage 10 may be used on any conventional microscope having a lens 25, a mirror 26 and a suitable source of light 27. As illustrated by the arrows in FIGURE 2, the light passes through the solution in the reservoir R for observation and because of the fact that the electrodes 15, 16 extend across the full width of the reservoir R the electrolytic action of any area of the preparation may be observed by properly positioning stage 10 on the usual fixed support of the microscope (not shown). Also, it is apparent that the electrodes 15, 16 do not in any manner obstruct the view through the lens 25 of the microscope since said electrodes 15, 16 are conveniently disposed immediately adjacent the ends of the wall member 12, as is well illustrated in FIGURE 2.

It should now be apparent that the stage 10 provided by the present invention is of simple construction so as to be desirably low in cost, and yet is of such structure as to be rugged for reliable use and a long life in the laboratory. Also, the stage 10 is such as to be easily and quickly prepared for the testing operation and because of the high efficiency electrodes 15, 16 is capable of being utilized to particular advantage in a simplified test circuit, now to be described.

Thus, as shown by the schematic diagram of the overall system in FIGURE 3, two microscope stage units 10a, 10b, constructed in accordance with the above description, are utilized. These units 10a, 10b are connected into opposed arms of a Wheatstone bridge 30 with one of the units 10a being for receiving the test preparation and the other of the units 10b being for receipt of a standard preparation against which the test preparation is to be compared. The Wheatstone bridge 30 is completed by standard resistors 31, 32 along the remaining arms so that input terminals 33, 34 and output terminals 35, 36 are formed. Preferably, a source of alternating current 37 is connected across the input terminals 33, 34 for energizing the Wheatstone bridge 30; it being understood that in some applications the source 37 could be direct current, although alternating current is preferred in most instances to prevent polarization of the electrodes 15, 16.

In accordance with this aspect of the present invention, the high efficiency electrodes 15, 16 may be connected directly to a simplified reading circuit 39 having a pair of amplifying tubes $T_1$, $T_2$ through leads 40, 41. Preferably, these leads 40, 41 are connected to grids or anodes 42, 43 of the amplifying tubes $T_1$, $T_2$, which are thus charged with the existing electrical potential at the output terminals 35, 36. These amplifying tubes $T_1$, $T_2$ contain cathodes 44, 45 which are connected in parallel by a common lead 46. Plates 47, 48 of the tubes $T_1$, $T_2$ are interconnected through leads 49, 50 to a pair of resistors 51, 52 and positioned between the resistors 51, 52 is a rheostat 55 having an adjustable pointer 56. The reading circuit 39 also includes a pair of DC power sources 57, 58 with an intermediate ground connection 59, which power sources 57, 58 serve to drive the amplifying tubes $T_1$, $T_2$. A constant current device 60, which may take the form of any of a number of well known electronic tubes or circuits, insures that the cathodes 44, 45 emit a constant stream of electrons toward the plates 47, 48. In turn, these two equal streams of electrons are controlled by the potential on the grids 42, 43 and the resulting difference in current flow in the leads 49, 50 thus represents an amplified signal of the resistance in the stage units 10a, 10b, respectively.

Connected to the leads 49, 50 so as to be in parallel with the rheostat 55 is a readout means 65 which may take the form of a conventional center scale voltmeter, a dual oscillscope, a pen recorder, or any other suitable meter capable of reading the differential output of the tubes $T_1$, $T_2$. Because of the high efficiency of the electrodes 15, 16 in transmitting current through the preparation in the reservoir R (note FIGURE 2), a well defined signal may be gained at the readout means 65 without further amplification.

To summarize the operation, the Wheatstone bridge 30 may be initially balanced and checked by placing a standard solution of equal resistivity in both of the stage units 10a, 10b and then adjusting the pointer 56 of the rheostat 55 so that the flow of current through the tubes $T_1$, $T_2$, as controlled by the respective grids 42, 43 and observed on the readout means 65, is equal. When the initial balance has been set the test unit 10a is filled with the preparation of the unknown resistive characteristic and the standard unit 10b is filled with the standard preparation. For example, when the test being performed is for determination of the pH factor of an unknown preparation, the standard unit 10b is filled with a solution having a pH of 7 so that when the power source 37 is activated the amount of imbalance in the Wheatstone bridge 30, as detected by the reading circuit 39, directly indicates the acidity or alkalinity of the unknown solution. In other words, when the readout means 65 is of a differential type, such as a center scale voltmeter, the direction and extent of the deflection of the meter will indicate the amount of deviation of the test preparation from the standard of pH of 7.

If desired, the Wheatstone bridge 30 may be split at the input terminals 33, 34 and provided with separate sources of alternating current in lieu of the single source 37 whereby two distinct oscillators are formed; one oscillator including the test unit 10a and the other oscillator including the standard unit 10b. The operation of this alternative arrangement is identical to that given for the preferred embodiment insofar as the differential output signal across the terminals 35, 36 is still capable of being detected and read through the simplified reading circuit 39. However, in this case either signal from the test units 10a, 10b may be independently weighted by the separate current sources to establish different levels and/or frequencies of potential on the grids 42, 43 whereby tests may be performed with more or less emphasis on the solution in either of said units 10a, 10b as desired.

It should now be realized that with the provision of the high efficiency electrodes 15, 16 and the provision of the simplified reading circuit 39, an improved system has been provided for observing and monitoring chemical preparations. Specifically, because of the passage of increased current through the unit 10a, 10b, the voltage outputs are substantially increased for a given resistance of the preparation being tested so that the usual high gain, staged amplifiers are not required. Further, it is clear that the system is desirably simple for low cost and easy to read and adjust during operation.

In this disclosure, there is shown and described only the preferred embodiment of the invention, but, as aforementioned, it is to be understood that the invention is capable of various changes or modifications within the scope of the inventive concept as expressed by the accompanying claims.

I claim:
1. A stage for holding a preparation to be viewed through a microscope and monitored through an electrical circuit for resistive characteristics comprising a transparent base of dielectric material for mounting on said microscope, an upstanding, closed wall member on said base forming a reservoir for said preparation, opposed efficiency measurement type electrodes extending into said reservoir, said electrodes interconnected with said circuit for determining resistive characteristics of said preparation and extending across the width of said reservoir whereby the full width of the cross section of said preparation is exposed to said electrodes to provide improved current flow through said preparation, and a pair of electrical terminals fixed to said base connecting the respective electrodes to said circuit, wherein said electrodes are T-shaped with each having an elongated cross element positioned within said reservoir and extending across the width of the adjacent wall member and a leg extending over said wall member for connection to said terminal.

2. The combination of claim 1 wherein said circuit comprises a Wheatstone bridge having input and output terminals and opposed balancing arms connected between the same, a voltage source connected to said input terminals, said microscope stage being connected across one arm of said Wheatstone bridge, a standard resistance reference connected across the opposite arm, a pair of electrical amplifying means each having a control grid connected directly to a respective one of said output terminals to monitor the voltage at said terminals, a second voltage source connected to said pair of amplifying means to drive the same, means for balancing the output signal of said pair of amplifying means, and readout means for detecting an output signal imbalance between said pair of amplifying means to thereby denote a variance of resistance across said electrodes from said standard reference to thus identify the resistive characteristics of said preparation.

3. The combination of claim 2 wherein said pair of amplifying means is connected in parallel and wherein is further provided a constant current device between said second voltage source and said pair of amplifying means whereby the accuracy of the output signal at said readout means is enhanced.

4. The combination of claim 2 wherein said readout means comprises a differential readout device whereby the accuracy of the output signal at said readout means is not affected by voltage variations in said system.

5. The combination of claim 2 wherein said balancing means comprises a rheostat in series with said pair of amplifying means for simultaneously varying the current therethrough, and wherein said readout means comprises a center scale voltmeter connected in parallel with said rheostat.

References Cited

UNITED STATES PATENTS

| | | | |
|---|---|---|---|
| 1,480,391 | 1/1924 | Hausser | 350—95 |
| 1,609,129 | 11/1926 | Roberts | 350—93 |
| 2,275,317 | 3/1942 | Ryder. | |
| 2,338,732 | 1/1944 | Nosker. | |
| 2,440,472 | 4/1948 | Horner et al. | 350—95 X |
| 2,474,692 | 6/1949 | Rossoff. | |
| 2,498,220 | 2/1950 | Porter | 350—90 |
| 2,531,145 | 11/1950 | Marco et al. | |
| 2,657,683 | 11/1953 | Koller | 324—113 X |
| 2,574,522 | 11/1951 | Bennett | 350—94 |
| 3,297,491 | 1/1967 | Kolenko | 350—93 X |

FOREIGN PATENTS 1,594     1885     Great Britain.

DAVID SCHONBERG, Primary Examiner

PAUL R. GILLIAM, Assistant Examiner

U.S. Cl. X.R.

350—67